United States Patent [19]

Shibata et al.

[11] Patent Number: 5,107,371
[45] Date of Patent: Apr. 21, 1992

[54] CEMENTED LENS AND PROCESS FOR PRODUCING THE SAME

[75] Inventors: Kenji Shibata; Agu Ueno, both of Tochigi, Japan

[73] Assignee: Canon Kabushiki Kaisha, Tokyo, Japan

[21] Appl. No.: 528,756

[22] Filed: May 25, 1990

[30] Foreign Application Priority Data

Jun. 1, 1989 [JP] Japan .................................. 1-140503

[51] Int. Cl.$^5$ ...................... B29D 11/00; G02B 23/00
[52] U.S. Cl. .................... 359/642; 359/355; 359/900
[58] Field of Search .............. 350/409, 417, 423, 320, 350/321; 359/350-361, 642-675, 900; 427/207.1-208.8; 156/502-509, 547, 903

[56] References Cited

U.S. PATENT DOCUMENTS

| | | | |
|---|---|---|---|
| 4,417,790 | 11/1983 | Dawson et al. | 350/409 |
| 4,679,918 | 7/1987 | Ace | 350/417 |
| 4,690,512 | 9/1987 | Forsyth | 350/417 |
| 4,934,792 | 6/1990 | Tovi | 350/320 |
| 4,969,729 | 11/1990 | Merle | 350/417 |

FOREIGN PATENT DOCUMENTS 59-184101 12/1984 Japan .

Primary Examiner—Bruce Y. Arnold
Assistant Examiner—Thong Nguyen
Attorney, Agent, or Firm—Fitzpatrick, Cella, Harper & Scinto

[57] ABSTRACT

A cemented lens comprising a first component having a polished first surface, a second component whose refractive index is different from that of the first component and having a second surface smoothed to a finish roughness of mesh #1400 or more but not polished, and an adhesive agent layer intervening between the first and second components to cement them at the first and second surfaces and having a refractive index which does not differ from that of the second component by more than 0.1.

13 Claims, 2 Drawing Sheets

CEMENTED LENS AND PROCESS FOR PRODUCING THE SAME

BACKGROUND OF THE INVENTION

1. Field of the Invention

This invention relates to a cemented optic lens having a plurality of optical elements cemented together and a process for producing the same.

2. Description of the Related Art

While the desired performance of the ordinary lens for photography can usually be realized by employing several component lenses to constitute the ordinary lens, it is not rare for the video taking-lens to necessitate more than ten component lenses. And, it is common in many cases that, for the purpose of correcting chromatic aberrations, etc., among these component lenses there are included two or three cemented lenses each consisting of positive and negative lens elements. FIG. 3 shows an example of the conventional taking-lens of the zoom type, wherein three component lenses labeled x, y and z are the cemented lenses.

Very briefly explaining, the process for producing a component lens comprises the steps of: cutting raw optical glass to the equivalent size, pressing, roughing (grinding), smoothing and polishing. Not only the component lens to be used as a singlet but also the component lenses to be used to constitute a cemented lens have to undergo a likewise process.

This is because even in the case of the cemented lens, its cemented surface must satisfy a predetermined transmission factor and conversely because, if scattering or the like occurs, an opportunity for deteriorating the optical performance would otherwise be involved. Hence, it has been the usual practice that even those surfaces of the lens elements which are to be cemented together are polished.

However, the cemented lens will be essentially sufficient if a prescribed function is satisfied as one component lens after the lens elements are cemented together. Hence, it is also possible to take a conception that there is no need to polish the lens surfaces which are to be cemented, since they are merely one element of its internal structures. This also can be guessed from the example of employment of a cemented lens in which a lens surface of a molded lens and a lens surface of a polished lens are cemented together in a photographic lens disclosed in Japanese Laid-Open Utility Model Application No. Sho 59-184101.

For example, even in the lens of popular optical glass, say, BK7, and of a small diameter of 2 to 3 cm, its polishing takes as long a time as 3 minutes. Taking into consideration the additional work of setting and removing the lens onto and from the tool, the total required time is not negligibly short. If the necessity of this step is obviated, it can be expected to achieve a remarkable reduction of the production cost since it considerably reduces the necessary number of steps in manufacturing lenses in the factory.

SUMMARY OF THE INVENTION

An object of the present invention is to clarify conditions which should be sought for in the cemented portion, while satisfying the optical performance demanded for the optical components constituting an optical system.

DETAILED DESCRIPTION OF THE PREFERRED EMBODIMENTS

At first, desirable conditions are described.

When a plurality of lens elements are cemented together:

(1) The difference between the refractive index of the lens and the refractive index of the adhesive agent is made smaller than 0.1.

(2) The finish roughness of the cemented surface of the lens in the smoothing step is made higher than mesh #1400.

And, without performing the polishing step that usually follows the smoothing step, the lens surface is put into adhesion with the polished surface of another lens. It is to be noted that the use of resin pellets of mesh #1500 gives a surface roughness of 0.2 to 0.3 microns. In a case where no adhesive agent of proper refractive index can be obtained, an adhesive layer may be formed on the target surface by evaporating a material of intermediate refractive index between the refractive indices of the material of the lens element and the adhesive agent. Even in this case, an equivalent result is effected.

The surface is usually polished to a roughness on a dimensional order that is less than the wavelength, for example, 0.5 microns or less. If the adhesive agent and the lens on which the adhesive agent is applied have exactly the same refractive index, however, their boundary does not cause light to refract at all. Even if the lens surface has minute concave and convex portions, therefore, they do not optically give any influence to the cemented refracting surface between the adhesive agent layer and the polished surface of the target lens. But, because, in reality, the available adhesive agent is few in number of kinds, in a case where the coincidence of the refractive indices is insufficient, it is important to limit the surface roughness to less than a certain level. From the experiments, it has been found that, in the actual practice, the above-cited conditions (1) and (2) in combination suffice for a satisfactory result.

It is to be noted that this example is applicable to all optical instruments of the type in which a plurality of objects of different refractive indices are cemented together and the light rays passing through the cemented portions are utilized. Therefore, it is not confined to the shape of the object to be cemented. It will be appreciated that the subject is solved by relying only on the correlation of the refractive indices of the two substances on either side of the cemented surface as the boundary, and the finish roughness of the cemented surface.

By the way, the photographic zoom lenses used in bench tests of the invention were for a video camera, each comprising twelve or fourteen component lenses, of which two or three are in the cemented form. However, the test result depends on the state in which light passes through the cemented lens, in other words, the position at which the cemented lens is used in the photographic lens. Some of the photographic lenses for the ordinary monitor camera have showed a good result with a finish roughness of mesh #1200 or even #1000.

Figure 1A:
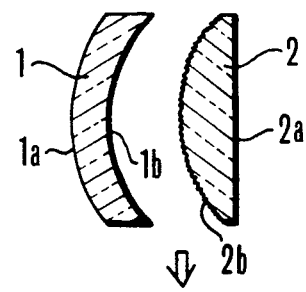
FIG. 1(A), FIG. 1(B), FIG. 2(A) and FIG. 2(B) are sectional views for explaining embodiments of the invention.
Figure 1B:
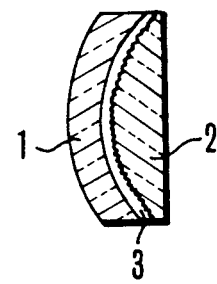

FIG. 1(A) shows a step prior to the cementing, and FIG. 1(B) shows a step subsequent to the cementing.

Reference numeral 1 denotes a negative meniscus-shaped glass lens of which the outer surface 1a and the cemented surface 1b undergo the polishing step. Reference numeral 2 denotes a positive glass lens having a refractive index different from that of the lens 1. Though its outer surface 2a undergoes up to the polishing step, its cemented surface 2b does not go beyond the smoothing step. In the ordinary cemented lenses, the refractive index of the positive lens is lower than that of the negative lens, while the adhesive agent of high refractive index is hardly available. Therefore, the positive lens is chosen to be made as the rough surface. This surface has to be finished to a roughness of at least mesh #1400. In some cases, a higher number in mesh has to be chosen depending on the performance of the lens.

Reference numeral 3 denotes the adhesive agent. What is used here is of the ultraviolet ray setting type as is sold under the trade name: Hard Lock OP, Type No. OP-1045K from Denki Kagaku Kogyo K.K. In FIG. 1(B), the axial thickness of the adhesive agent layer is depicted in exaggerated scale.

As has been described above, limitations have been laid on the refractive index and the finish roughness. If these conditions are not satisfied, a deterioration of the image quality is found, which originates from the cemented surface. This is caused to appear by the extraordinary scattering and a decrease of transmittance in the treated surface.

The cementing operation may be carried out without the necessity of altering the conventional way. So, the concave surface is put beneath, then coated with an adhesive agent layer, then the convex surface is gradually pressed against it, then centering is carried out, and then the adhesive agent is hardened by exposing to ultraviolet rays.

Figure 3:
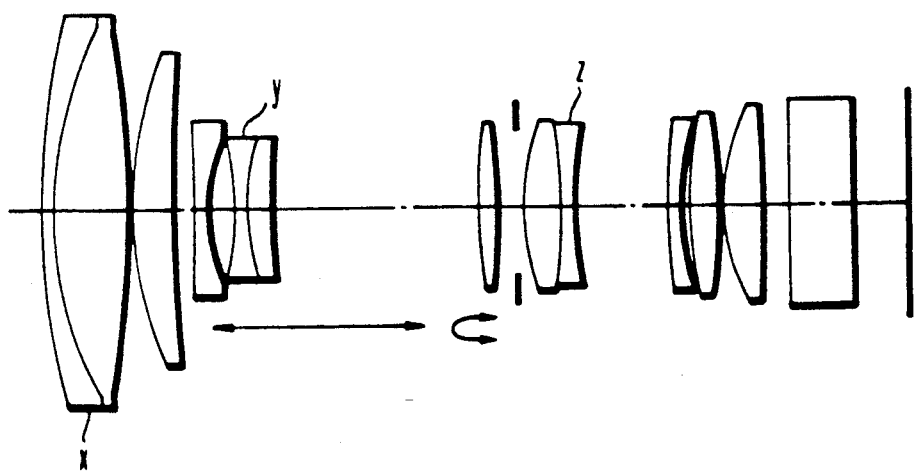
FIG. 3 is an optical section view of a zoom lens for video known in the prior art.

The thus-made cemented lens is used as the component lens y or z or both in the zoom lens of FIG. 3.

Figure 2A:
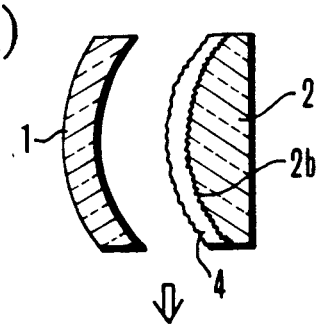
Figure 2B:
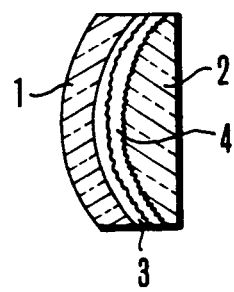

In reality, the refractive indices of the glass materials and adhesive agents sold in the market fall in a somewhat limited range. To satisfy the condition (1) at all times, therefore, a measure may be taken that the smoothed surface of the lens is further treated to form an intermediate layer by applying a coating of another material 4 (for example, cerium fluoride) thereon. In this case, as shown in FIG. 2(A), the cemented surface 2b of the lens element 2 is first smoothed to a finish of mesh #1400 or more, and then a coating of such a material 4 that the difference from the refractive index n of the adhesive agent 3 is reduced to 0.1 or less is applied to the cemented surface 2b. It is after this that the two lenses 1 and 2 are brought into cementing contact as shown in FIG. 2(B).

The invention is applicable also to cemented triplets or higher, and can be utilized in manufacturing cemented prisms. Furthermore, it can be utilized in manufacturing replica type aspheric lenses and filters.

According to the invention described above, one of the steps of the process for manufacturing cemented lenses or like other optics can be omitted, thereby giving an advantage that the production cost can be reduced by a significant amount, while nevertheless not involving such a problem that the image quality is caused to deteriorate. In turn, the decrease of the production cost provides a possibility of making a lens design with the use of a positively increased number of cemented lens members. Also, when mounting all the lens elements in fixedly secured relation to the lens barrel, since any of the cemented members has substantially two elements, to keep hold of only one element is sufficient. Even this can contribute to a reduction of the cost.

What is claimed is:

1. A cemented lens comprising:
   a first component lens with a first refractive index and having a first lens surface to which a polishing treatment is applied;
   a second component lens having a second refractive index different from that of said first component lens and having a second lens surface to which a smoothing treatment to make a finish roughness of not less than mesh #1400 is applied but to which a polishing treatment is not applied; and
   an adhesive agent layer for cementing said first component lens and said second component lens together by coming into contact with said first lens surface and said second lens surface, said adhesive agent layer having a refractive index which differs from said second refractive index by 0.1 or less.

2. A cemented lens according to claim 1, wherein said first component lens has a negative refractive power, and wherein said second component lens has a positive refractive power.

3. A cemented lens according to claim 1 or claim 2, wherein said second lens surface has a surface roughness of the order of 0.1 μm.

4. A cemented lens according to claim 1 or claim 2, wherein said first lens surface has a surface roughness of the order of 0.01 μm or less.

5. A process for producing a cemented lens comprising:
   a step of applying a polishing treatment to a first lens surface of a first component lens;
   a step of applying a smoothing treatment to make a finish roughness of not less than mesh #1400 to a second lens surface of a second component lens; and
   a step of cementing said first and second component lenses together by sandwiching an adhesive agent having a refractive index which differs from that of said second component lens by 0.1 or less between said first lens surface and said second lens surface.

6. A process according to claim 5, wherein said first component lens has a negative refractive power, and wherein said second component lens has a positive refractive power.

7. A cemented optical element comprising:
   a first component element having a first surface to which a polishing treatment is applied;
   a second component element having a second refractive index different from that of said first component element and having a second surface to which a smoothing treatment to make a finish roughness of not less than mesh #1400 is applied but to which a polishing treatment is not applied;
   an adhesive agent layer for cementing said first component element and said second component element together; said adhesive agent layer being in contact with said first surface; and
   an intermediate layer having a third refractive index which is between the refractive indices of said second component element and said adhesive agent layer, said intermediate layer being formed on said second surface by coating, and being in contact with said adhesive agent layer.

8. A cemented optical element according to claim 7, wherein a difference between the refractive indices of said adhesive agent layer and said intermediate layer is 0.1 or less.

9. A zoom lens comprising a plurality of lenses, wherein at least one of said plurality of lenses is a cemented lens, with said cemented lens further comprising:
   a first component lens having a first lens surface to which a polishing treatment is applied;
   a second component lens having a refractive index different from that of said first component lens and having a second lens surface to which a smoothing treatment to make a surface roughness on the order of 0.1 μm is applied; and
   an adhesive agent layer for cementing said first component lens and said second component lens together by coming into contact with said first lens surface and said second lens surface, said adhesive agent layer having a refractive index which differs from that of said second component by 0.1 or less.

10. A zoom lens according to claim 9, wherein said first component lens has a negative refractive power, and wherein said second component lens has a positive refractive power.

11. A zoom lens according to claim 9, wherein said first lens surface has a surface roughness of 0.01 μm or less.

12. A zoom lens according to claim 3, wherein said first and second component lenses are made of glass.

13. A zoom lens according to claim 10, wherein said first and second component lenses are made of glass.

* * * * *